(No Model.)

A. F. HAMMER-PURGSTALL.
LIP PROTECTOR.

No. 343,170. Patented June 8, 1886.

Attest:
W. E. Coulter
O. W. Knoblock

Inventor:
Arthur F. Hammer-Purgstall
per Henry Orth
his atty.

UNITED STATES PATENT OFFICE.

ARTHUR FREIHERR HAMMER-PURGSTALL, OF GRÄZ, (STYRIA,) AUSTRIA-HUNGARY.

LIP-PROTECTOR.

SPECIFICATION forming part of Letters Patent No. 343,170, dated June 8, 1886.

Application filed December 16, 1885. Serial No. 185,871. (No model.) Patented in France November 21, 1885, No. 172,446; in Belgium November 21, 1885, No. 70,941, and in England November 23, 1885; No. 14,334.

*To all whom it may concern:*

Be it known that I, ARTHUR FREIHERR HAMMER-PURGSTALL, a subject of the Emperor of Austria, residing at Gräz, (Styria,) at present at Vienna, in the Empire of Austria-Hungary, have invented certain new and useful Improvements in Lip-Protectors, (for which I have received Letters Patent in the following countries: in France, No. 172,446, under date of November 21, 1885; in Belgium, No. 70,941, under date of November 21, 1885, and in England, No. 14,334, under date of November 23, 1885;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a device adapted for application to drinking-vessels—such as cups, goblets, or glasses, &c.—to protect the lips against contact with the surfaces of the material of which the drinking-vessel is composed.

It is not only extremely disagreeable to drink out of a vessel intended for public use—as in railroad-cars, public institutions, drinking-fountains, &c.; but in many cases such public use of the same drinking-vessels may become a source of danger to health by absorption of saliva adhering to the vessel from which a diseased person has been drinking, and it is well known that rinsing of the vessel will not always remove the adhering matter. In any event it is not pleasant to drink from a vessel from which others have been drinking; and the object of this invention is to provide a means whereby this unpleasant feature may be avoided, without necessitating the carrying of a drinking-cup, by means of a lip-protector or cheiloskeps; and the invention consists of a plate U-shaped in cross-section, having substantially the outer form or configuration of the contacting surfaces of the lips, of segmental form, and of a material possessing sufficient elasticity to adapt it for use on drinking-vessels of various diameters and thicknesses of material, and adapted to be carried in the pocket.

Figure 1:
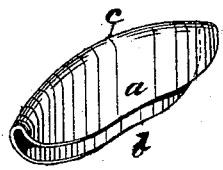
Figure 2:
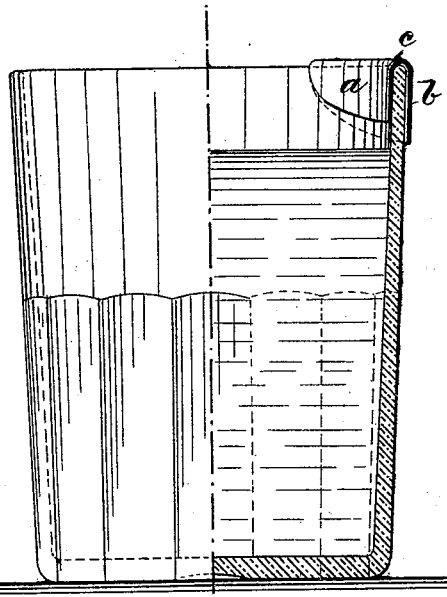

In the accompanying drawings, forming a part of this specification, Figure 1 shows, by an isometrical view, my improved lip-protector or cheiloskeps. Fig. 2 shows, by a sectional elevation, its application to a glass.

In the above figures of drawings, $c$ represents a plate, which is bent double or of U shape in cross-section and of segmental form, the outer surfaces, $a\ b$, of which are so constructed as to conform or approximately conform to the contacting surfaces of the lips, the surface $a$ corresponding to the contacting surface of the upper lip and that $b$ to the corresponding surface of the lower lip.

The material from which this lip-protector is made should embody the following properties: Impermeability to fluids, a certain degree of rigidity, and sufficient elasticity to adapt itself to arcs of circles of different degrees and to different thicknesses of the rims of drinking-vessels. Various materials possessing these properties are known and which may be employed in the manufacture of my improved lip-protector—as, for instance, hard rubber, celluloid, horn, &c.

By giving to the outer surfaces of the lip-protector the form, or substantially the form, of the contacting surfaces of the lips the operation of drinking is rendered more easy than would be the case otherwise, and by making the same of a material having the properties specified it may be applied to drinking-vessels of different diameters and of varying thicknesses in the rims thereof.

I do not herein desire to claim the construction of devices shown by Letters Patent of the United States, No. 91,936, of 1869, and No. 247,780, of 1881, which devices are provided with a spout or neck, through which the liquid is drawn, or such a spout and a strainer combined therewith; nor do I desire to claim herein a moustache-guard adapted to be applied to drinking-vessels and provided with a plate formed at right angles to the body of the guard and projecting partially across the drinking-vessel when said guard is applied to the latter, as shown in the patents referred to.

Having now described my invention, what I claim is—

1. The herein-described lip-protector, consisting of a plate U-shaped in cross-section, having its outer surfaces, $a\, b$, formed to correspond with or approximately correspond with the surfaces of the lips, and constructed to be applied to the rim of a drinking-vessel, substantially as and for the purpose specified.

2. The herein-described lip-protector, consisting of a plate U-shaped in cross-section, of segmental form, and of a material of sufficient elasticity to adapt itself to the rim of drinking-vessels of different diameter and thickness, as and for the purpose specified.

In testimony whereof I affix my signature in presence of two witnesses.

ARTHUR FREIHERR HAMMER-PURGSTALL.

Witnesses:
EDMUND JUSSEN,
HENRY DAVIDS.